United States Patent [19]
Walters et al.

[11] Patent Number: 5,953,202
[45] Date of Patent: Sep. 14, 1999

[54] HIGH ENERGY DENSITY CAPACITOR FILMS AND CAPACITORS MADE THEREFROM

[75] Inventors: Glenn J. Walters; Gordon E. Walters, both of Duxbury, Mass.

[73] Assignee: Advanced Deposition Technologies, Inc., Taunton, Mass.

[21] Appl. No.: 08/796,886

[22] Filed: Feb. 6, 1997

[51] Int. Cl.[6] ..................... H01G 4/06
[52] U.S. Cl. .............. 361/311; 361/313; 361/321.5; 361/321.6; 428/66.6; 428/77; 428/78; 428/79; 428/134; 428/209
[58] Field of Search ............. 361/306.1, 306.2, 361/306.3, 308.3, 311–314, 321.2, 321.4, 534, 321.6, 303–305, 327, 328, 329, 275.2, 275.3, 275.4, 273, 274.1–275.1, 272; 337/297, 227, 140, 290, 292, 293, 294, 295, 296, 412, 416; 428/66.6, 77–79, 134, 138, 209

[56] References Cited

U.S. PATENT DOCUMENTS

| | | | |
|---|---|---|---|
| 3,298,864 | 1/1967 | Maylandt | 117/212 |
| 4,193,106 | 3/1980 | Coleman | 361/275.4 |
| 4,237,440 | 12/1980 | Miyasaka et al. | 337/227 |
| 4,482,931 | 11/1984 | Yializis | 361/273 |
| 4,494,168 | 1/1985 | Kume et al. | 361/273 |
| 4,670,814 | 6/1987 | Matsui et al. | 361/274.3 |
| 4,677,523 | 6/1987 | Kauppi | 361/329 |
| 4,734,670 | 3/1988 | Westrom et al. | 337/159 |
| 4,748,536 | 5/1988 | Robinson | 361/272 |
| 4,757,423 | 7/1988 | Franklin | 361/275.4 |
| 4,894,746 | 1/1990 | Mori et al. | 361/275 |
| 5,453,906 | 9/1995 | Doll | 361/273 |
| 5,717,563 | 2/1998 | MacDougall et al. | 361/303 |

FOREIGN PATENT DOCUMENTS

| | | | |
|---|---|---|---|
| 0 073 555 A2 | 3/1983 | European Pat. Off. | H01G 1/01 |
| 0 243 288 A1 | 10/1987 | European Pat. Off. | H01G 1/017 |
| 0 450 455 A2 | 10/1991 | European Pat. Off. | H01G 1/017 |
| 0 813 213 A1 | 12/1997 | European Pat. Off. | H01G 4/015 |
| WO 97 03452 A1 | 1/1997 | WIPO | H01G 4/015 |

*Primary Examiner*—Hyung-Sub Sough
*Assistant Examiner*—Anthony Dinkins
*Attorney, Agent, or Firm*—Wolf, Greenfield & Sacks, P.C.

[57] ABSTRACT

Materials from which metal film capacitors with plastic or other dielectric films are formed include a plurality of regions or segments defining plates of a capacitor, the regions electrically interconnected by fuse regions which separate a region containing a short circuit fault from the capacitor. The plurality of regions or segments are circular. The fuse regions may be circular or may alternatively be high resistivity regions filling spaces between the plurality of regions or segments. A capacitor having a higher energy storage density and safer construction is wound from these materials using conventional techniques.

39 Claims, 7 Drawing Sheets

HIGH ENERGY DENSITY CAPACITOR FILMS AND CAPACITORS MADE THEREFROM

BACKGROUND

The present invention relates to high energy density capacitors and metallized films for making high energy density capacitors which have improved self healing properties, that is capacitors which clear a short circuit fault without undergoing a catastrophic failure. More particularly, the present invention relates to improved metallized films having fusible features, whereby a short-circuited part of a capacitor constructed from such a material may be removed from active use. Further, the invention relates to capacitors made from such films.

Standard metallized film capacitors are formed of a material including two thin metal film layers (the plates) separated by a thin sheet of dielectric film, e.g., polyester, polyethylene terephthalate (PET), etc. A capacitor comprises a long strip of such metallized dielectric film material wound into a cylindrical form.

Electrical leads connect the capacitor into a circuit. One lead connects a branch of the circuit to each of the plates. One plate of the capacitor is metallized up to and including one edge of the dielectric film, the contact edge, while an opposite edge of the dielectric film is left clear of metal, the clear edge. The other plate of the capacitor is similarly arranged, but with the contact edge and clear edge reversed. After winding, the exposed contact edges are spray terminated, as is known in this art, to provide a direct electrical contact to all parts of each plate from a corresponding lead.

Such metallized film capacitors have a unique self healing property, for which they are considered useful. When a metallized film capacitor is exposed to an excessive voltage, a short circuit may develop through the dielectric film, between the plates of the capacitor. A substantial short circuit current may temporarily flow through the short circuit. However, the short circuit current flowing through the short circuit region often burns away part of one of the metal layers in the vicinity of the short circuit, opening the short circuit, much like a fuse.

The dimensions of a capacitor, its maximum working voltage, and its capacitance define the energy density of the device, according to:

$$\text{Energy density} = \frac{CE^2}{2V} \left(\frac{\text{Joules}}{\text{cm}^3}\right),$$

where C is in farads, E is in volts and V is in $cm^3$. Although dielectric films currently in use have dielectric strengths of about 500V/$\mu$m, a typical conventional capacitor using 6$\mu$m dielectric film has a maximum working voltage of about 380V. A conventional capacitor using 8$\mu$m dielectric film has a maximum working voltage of about 450–480V. Exceeding these values in a component not designed for such stress levels can result in an unsafe condition in which a high short circuit current discharges substantially all the stored energy in the capacitor through the fault, causing the catastrophic destruction of the capacitor. Such catastrophic destruction occurs because the high current carbonizes some surrounding dielectric, resulting in an avalanche of current discharged through an ever-increasing fault.

In a more advanced conventional capacitor, made for example from the materials shown in FIGS. 1 and 2, segmented metal film capacitors take the fuse concept a step further. In such structures, a plurality of metal regions within the capacitor are interlinked by small fuses. When a short circuit develops in one of the plurality of regions, the fuses interlinking that region to adjacent regions will fail, removing the defective region from the capacitor, avoiding a catastrophic failure of the capacitor or the circuit in which the capacitor is used.

In the plan views of FIGS. 1 and 2, only one of the two metal film layers is shown. However, it should be understood by those skilled in this art that a substantially corresponding pattern may be formed by the second metal film layer, so that the two plates, separated by the dielectric film, overlap for substantially all of their areas. Alternatively, the second metal film layer may overlap substantially all the area of the first metal film layer, but without slits (FIG. 1, 107) or non-metallized areas (FIG. 2, 205), which are explained below, i.e., the second metal film layer may be metallized in areas corresponding to slits (FIG. 1, 107) or non-metallized areas (FIG. 2, 205).

In the conventional segmented material shown in FIG. 1, a polypropylene film 101 carries a metallization pattern 103 in which a plurality of metallized segments 105 separated by slits 107 along most of their length are connected at one edge by small fuse areas 109.

In another conventional material shown in FIG. 2, a polyester film 101 carries a metallization pattern 201 in which a plurality of substantially square regions 203 are separated by surrounding non-metallized areas 205. Small fuse areas 207 may interconnect adjacent square regions 203. This pattern is referred to hereinafter as the "checkerboard" pattern. In this structure, when an individual square 203 (the affected square) develops a short circuit, the fuse areas 207 interconnecting the affected square 203 to adjacent squares 203 break, isolating the affected square 203.

In each of these conventional designs, the total capacitor area may be on the order of several square meters. The segments or square regions are generally on the order of a few square centimeters or less. Thus, the change in capacitance which results from isolating a segment or region in which a short circuit has developed is small, typically much less than 0.01%.

One problem with conventional segmented capacitors, particularly those employing the checkerboard pattern, is poor long-term capacitance stability due to electrochemical erosion of the metal film layers. The effect is pronounced at sharp corners or edges, of which the checkerboard pattern has an abundance. Due to the size of the squares and the number of corners and edges found in a typical capacitor, electrochemical erosion can account for a change in capacitance of up to 5%. By comparison, the loss of only 1 or 2 $1cm^2$ squares out of $5m^2$ of metal film plate area, produces a change in capacitance of only 0.002–0.004%. The segmented design suffers less from electrochemical erosion because it does not have as many sharp corners in the pattern. However, the segmented design of FIG. 1 is less able to withstand excessive voltages, since it is constructed of fewer, larger segments. Moreover, the larger segments require higher fault currents to clear a short circuit fault due to their larger area than the squares of the checkerboard pattern.

SUMMARY OF THE INVENTION

It is a general aim of the present invention to provide an improved metallized film capacitor material and improved capacitors made therefrom having higher energy storage densities and safer constructions than conventional non-segmented constructions.

In accordance with one aspect of the invention, a metallized dielectric film may include a plurality of electrically interconnected metallized circular areas disposed on a surface of the dielectric film, whereby electrochemical erosion when the circular areas carry an electrical charge is reduced.

In accordance with another aspect of the invention, a fuse element on a metallized dielectric film may be formed of a grid pattern of metallized lines. This fuse element may be combined with the first mentioned aspect of the invention.

In accordance with yet another aspect of the invention, a capacitor, at least one plate of which is formed on a dielectric film, may include a plurality of electrically interconnected metallized circular areas disposed on a surface of the dielectric film. As with the aspects of the invention discussed above, the capacitor may be formed of a metallized dielectric film including a fuse element including a grid pattern of metallized lines.

In accordance with yet another aspect of the invention, a metallized dielectric film may include a plurality of metallized circular areas of low resistivity; and means interconnecting the plurality of metallized circular areas for separating one circular area from other circular areas when an excessing current flows through the means for separating.

A capacitor in accordance with yet another aspect of the invention may include plural means for carrying an electric charge without undergoing electrochemical erosion; and means interconnecting the plural means for carrying an electric charge, for separating one of the plural means for carrying from another when an excessive current flows through the means for separating.

Finally, a metallized dielectric film in accordance with yet another aspect of the invention may include a plurality of metallized areas of low resistivity interconnected by a high resistivity metallization in a region between the plurality of metallized areas.

BRIEF DESCRIPTION OF THE DRAWINGS

In the figures, in which like reference numerals designate like elements.

DETAILED DESCRIPTION

The present invention will be better understood in view of the following detailed description of some exemplary embodiments thereof, read in connection with the figures.

Figure 3:
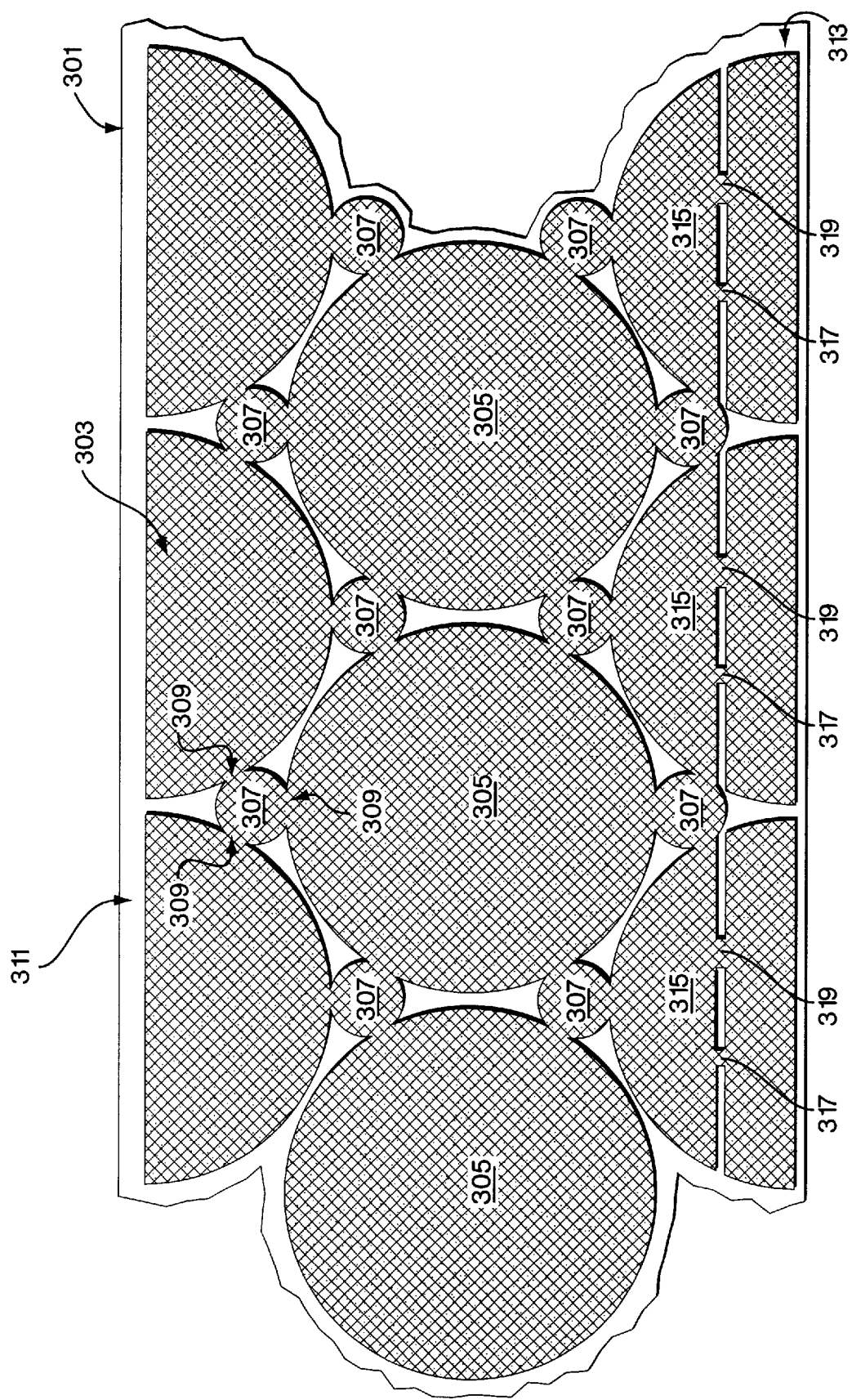
FIG. 3 is a plan view of a material carrying a metal film pattern according to an embodiment of the present invention, including large and small circular regions of metal film.

FIG. 3 shows a plan view of a metallized dielectric film 301 in which a pattern metallized metal film layer 303 forms a pattern of circular metallized areas 305 interconnected by fuse areas. An opposite surface of the polyester film may carry either a solid or a similar pattern metallized layer covering substantially corresponding areas, as discussed above in connection with conventional materials. The pattern of this embodiment includes two sizes of circles, referred to as large and small. The small circular areas 307 electrically interconnect the large circular areas 305, forming plates of the capacitor, one on each surface of the dielectric film 301. The small circular areas 307 define small fuse regions 309.

The pattern described above extends from near an edge of the dielectric film clear of metal 311 to a contact edge 313 of the dielectric film at which wires or other connecting leads are attached. The contact edge 313 and clear edge 311 are reversed on the opposite side of the dielectric film 301, so that the leads are connected on opposite edges of the film 301. In this exemplary embodiment, the contact edge 313 runs through a line of large circular areas, forming large semi-circular areas 315. Within the large semi-circular areas 315 at the contact edge 313 of the material are two fuses 317 and 319 designed to break at different values of current. The currents at which fuses break are referred to hereinafter as fusing currents. In the illustrative embodiment, the two edge fuses 317 and 319 have different cross-sectional areas, causing the two edge fuses 317 and 319 to have different fusing currents.

Figure 1:
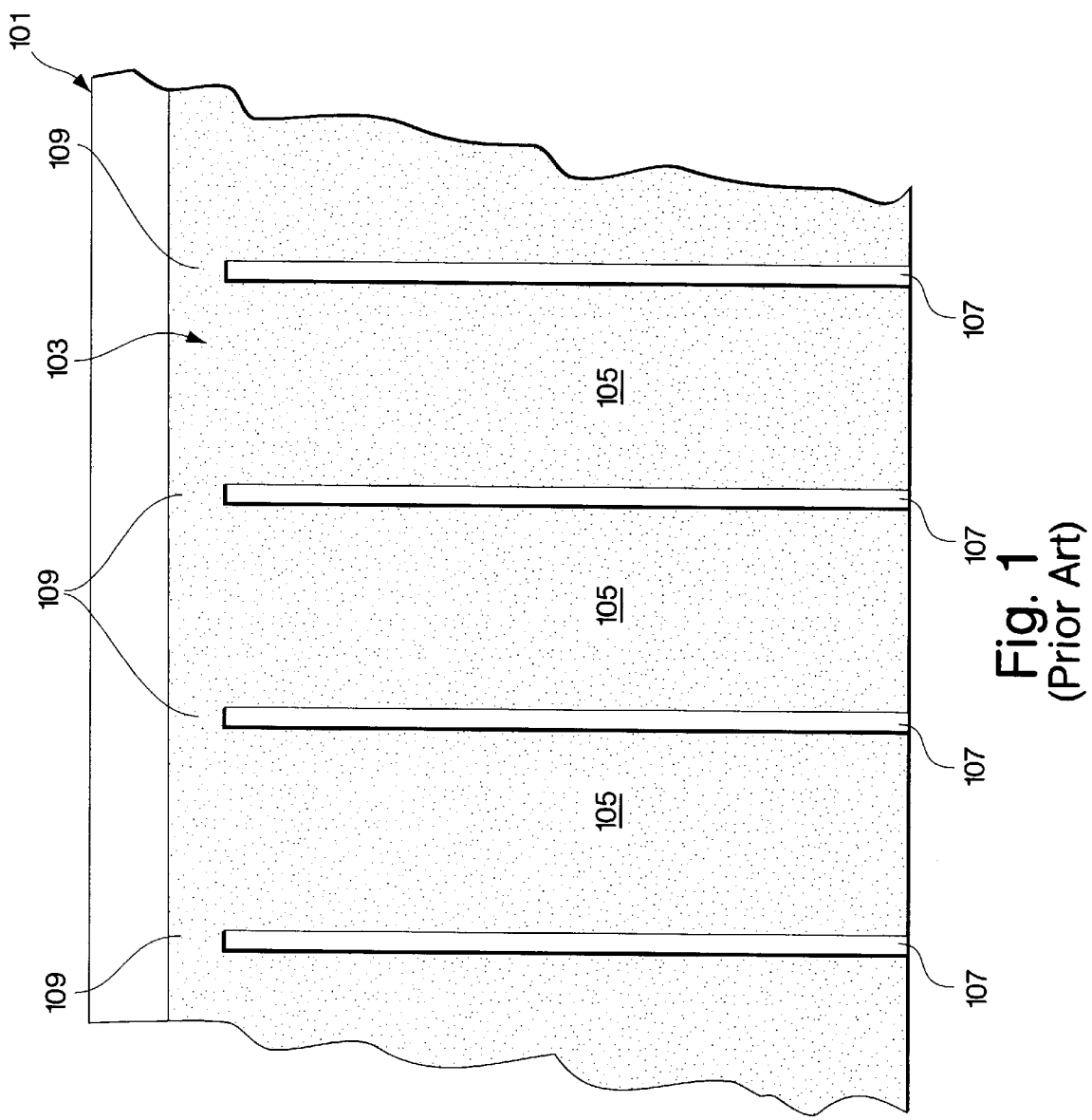
FIG. 1 is a plan view of a conventional material suitable for constructing segmented metal film capacitors.
Figure 2:
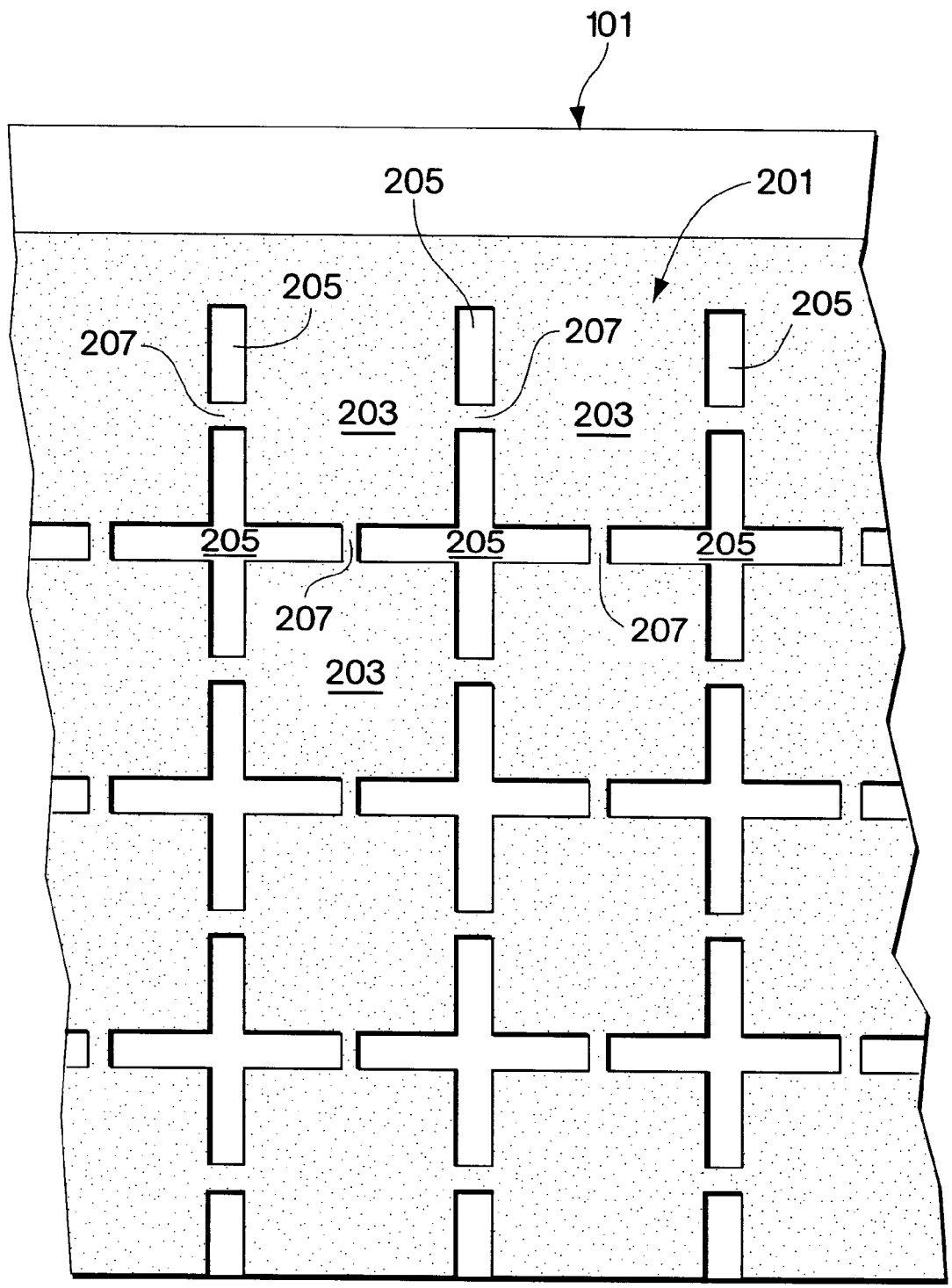
FIG. 2 is a plan view of a conventional material suitable for constructing checkerboard pattern metal film capacitors.

The fuses 309 between large circular areas operate substantially the same as the operation of the fuses (FIG. 1, 109; FIG.2, 207) in conventional segmented capacitor materials. That is, when an affected segment develops a short circuit due to excessive voltage applied, the current through the short circuit tends to cause the fuses leading to the affected segment to break, thus electrically disconnecting the affected segment from the remaining areas of the capacitor. The fuses 309 between large circular areas 305 are designed for fusing currents which result from a fuse area of about 1 mm. However, the choice of fusing current suitable for any particular application is left to the skilled designer.

The fuses 317 and 319 at the contact edge 313 operate in a somewhat more complex manner. The plural fuses of different capacities provide a multi-level mechanism for clearing a short circuit fault.

1. The short circuit current which flows into a sufficiently small fault may "clear" the fault by evaporating surrounding metal, without breaking either of the fuses.

2. If a somewhat larger short circuit current flows, or the short circuit current flows for a long enough time, the smaller of the two edge fuses 317 breaks. The larger of the two fuses 319 may carry the entire short circuit current for a period of time sufficient for the short circuit current to clear the fault at the fault site, as described above.

3. If a yet larger short circuit current flows, or the short circuit current continues to flow for a substantial time after causing 2, above, to occur, then the larger fuse 319 finally breaks.

The above described multi-level mechanism improves the control over clearing a short circuit fault and avoids removing a segment from the capacitor unnecessarily. Consider the situation in which the short circuit fault clears only after the first fuse breaks. Suppose further that the fault clears just before the second fuse would have broken. In this set of circumstances, a single fuse the size of the second fuse would be inadequate because the additional time required to break the first fuse helps provide the time and current required to clear the fault at the fault site. Using a larger single fuse could provide the time and required to clear such a fault, but a larger single fuse provides less protection against dangerous short circuit currents flowing in the capacitor circuit.

In the exemplary embodiment, the fusing currents of the edge fuses are set by defining the fuse areas as follows. The larger fuse 319 occupies about 2 mm, while the smaller fuse 317 occupies about 1 mm. Other fusing currents resulting from different fuse areas could be used in other embodiments, as will be understood by those skilled in the art.

The use of circular metal areas in this exemplary embodiment of the invention substantially overcomes the electrochemical erosion problem of the prior art because the circular areas do not present any sharp corners at which electrochemical erosion is most likely to take place.

Figure 4:
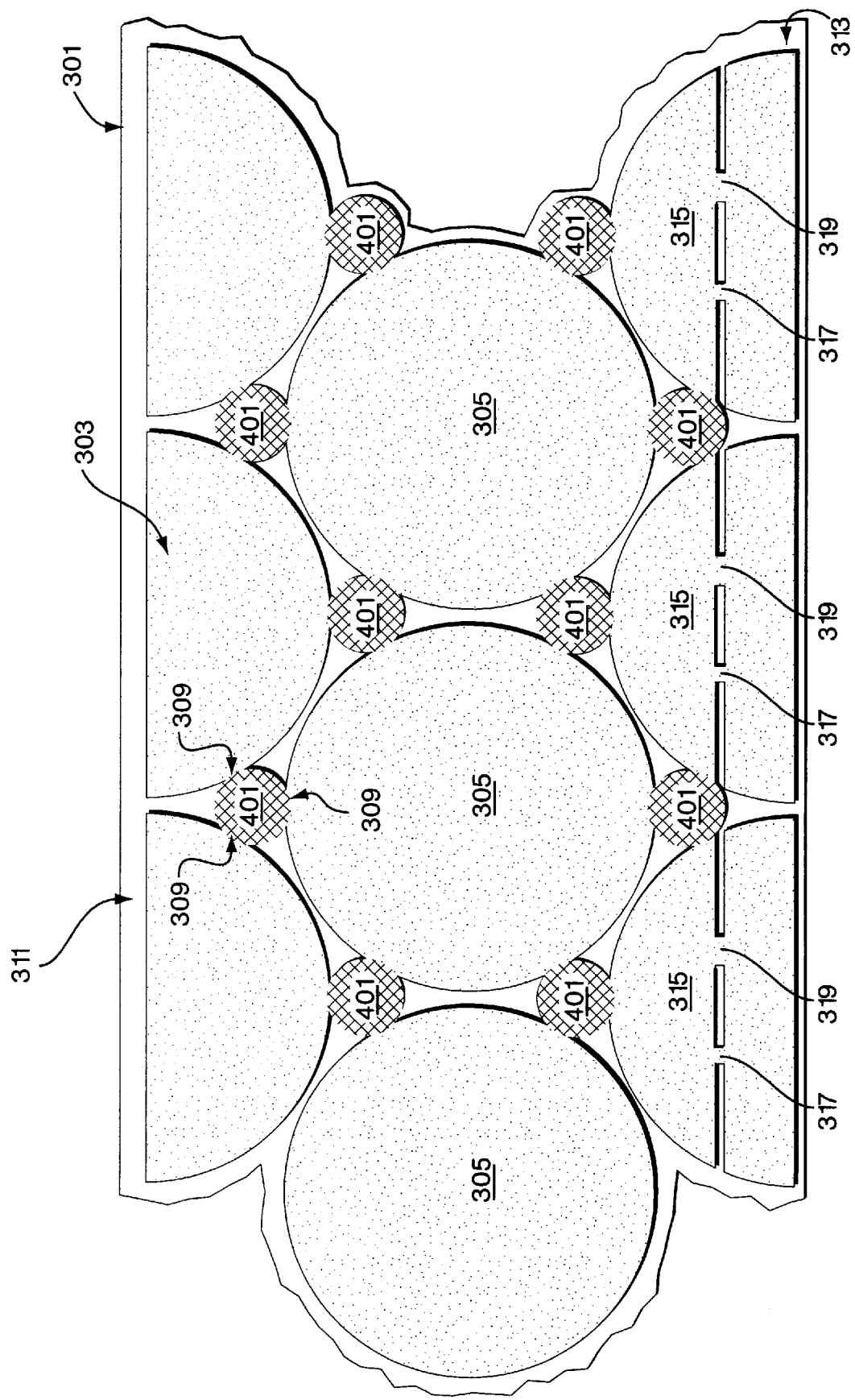
FIG. 4 is a plan view of a material carrying a metal film pattern according to another embodiment of the invention, including large circular regions of metal film and small circular regions containing a grid pattern of metal film lines.

A second exemplary embodiment, described below, is shown in FIG. 4.

In this exemplary embodiment, a grid or parallel line pattern with a line spacing in a range of 20–100 lines per inch defines small circular areas 401. Changing the line spacing provides additional control over the characteristics of the fuse regions. Changing the grid or line pattern, tailors the fusing current and time to a particular application. Note that the grid or line pattern could be used in or around fuse areas of conventional segmented electrode capacitors to provide similar additional control over fuse characteristics, in such a conventional design.

Figure 5:
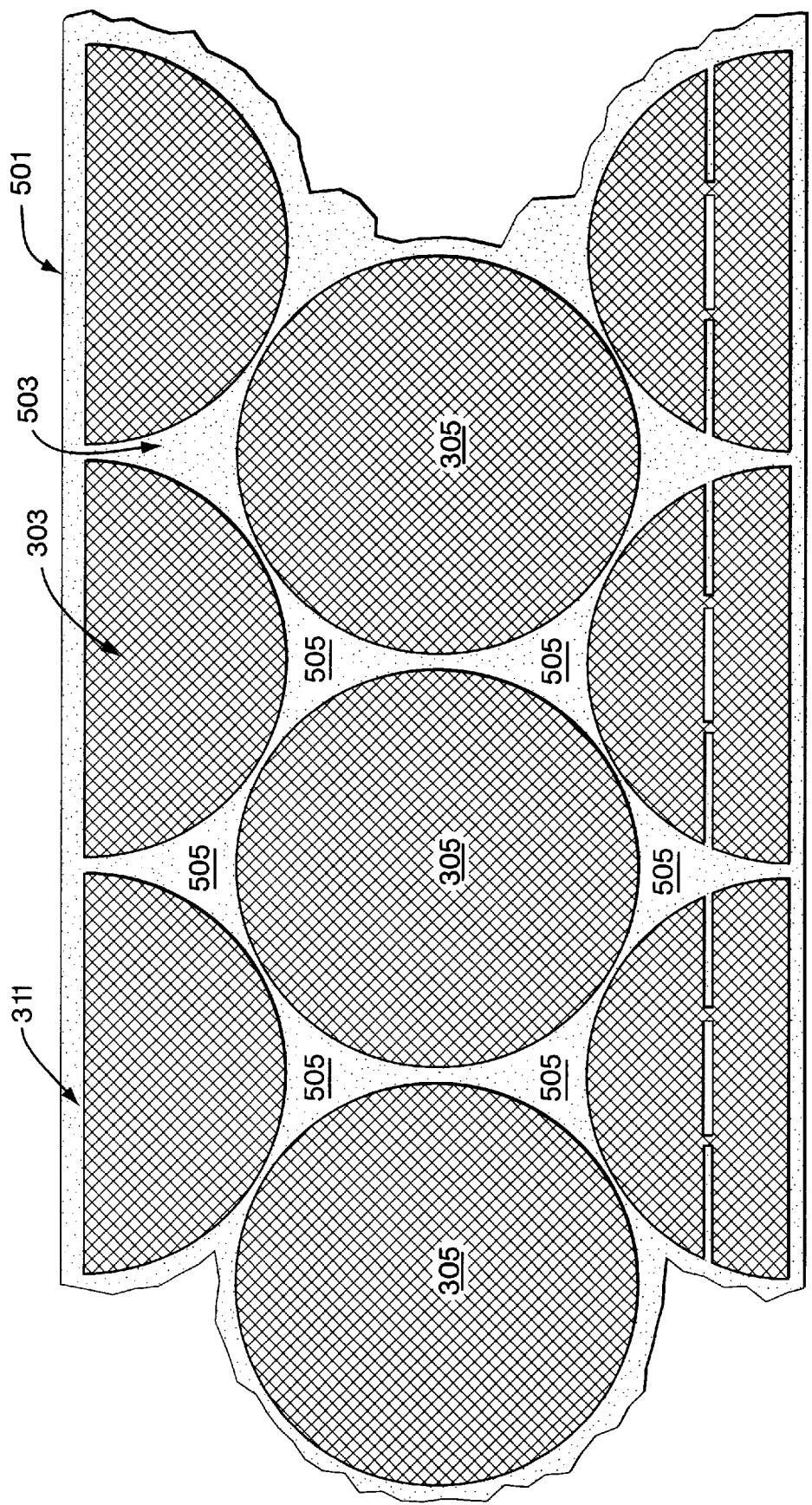
FIG. 5 is a plan view of a material carrying a metal film pattern according to yet another embodiment of the invention, including large circular regions of metal film and a thin metal film between the large circular regions of metal film.

A third exemplary embodiment is now described in connection with FIG. 5.

In this embodiment, small circular areas are not used to form the fuses. Rather, a very light coating of metal 503 having a relatively high resistivity is formed over the entire surface of a dielectric substrate 501 before the pattern metallization 303 of large circles 305 is formed. If the large circular areas 305 are assumed to have a resistivity of about $5\Omega/\square$, then the light coating of metal 503 should have a thickness which results in a relatively high resistivity of about $100-200\Omega/\square$ for the light coating alone. The high-resistivity areas 505 between the large circle areas 305 act as fuse regions separating any circle from the rest of the plate area. The light metal coating 503 of the high resistivity areas easily vaporizes, breaking the fuse, at a fusing current of not more than about 20% of the current which would be required to vaporize a corresponding portion of the large circle areas 305.

This third embodiment provides several advantages. Conductive metal covers the entire surface of the dielectric film, therefore maximizing the plate area of the capacitor for a given size dielectric film. More circles of a smaller diameter can be used with no loss of plate area of the capacitor. The area lost due to a short circuit fault in any one circle is correspondingly less. Moreover, other shapes which could not otherwise be used due to electrochemical erosion can be used in place of the large circles of this embodiment. This construction essentially eliminates the sharp corners and edges which are most subject to electrochemical erosion.

Figure 6:
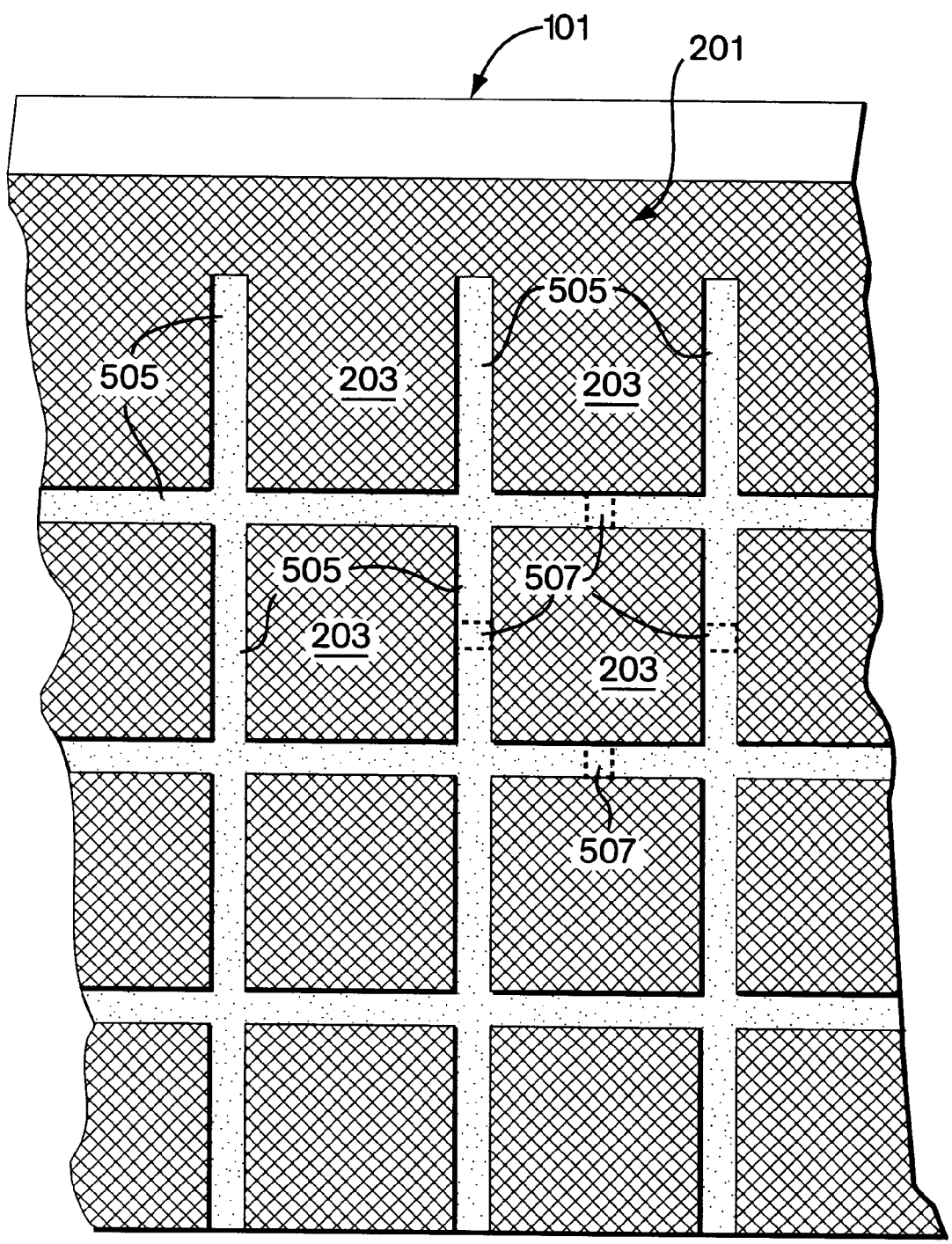
FIG. 6 is a plan view of a material carrying a metal film pattern according to yet another embodiment of the invention, including a checkerboard pattern of metal film regions having disposed therebetween a thin metal film.

In a fourth embodiment of the invention shown in FIG. 6, the checkerboard pattern is again used. However, square metal regions 203 having low resistivity are bounded by regions of high resistivity, i.e., light, metallization 505, as described above in connection with the embodiment of FIG. 5. This embodiment operates similarly to that of FIG. 5, and obtains similar advantages. The square regions 203 undergo insubstantial electrochemical erosion because the corners and edges are in continuous physical and electrical contact with the high resistivity metallized regions 505, minimizing the electrical fields which otherwise would intensify at such locations. The pattern described may also include fuse areas 507 as used in conventional checkerboard material. Combining such fuses with the high resistivity metallized regions 505 produces a multi-level fusing mechanism such as described above in connection with fuses 317 and 319 of FIG. 3. Metallized region 505 will generally act as a smaller fuse, while fuse area 507 acts as a larger fuse.

The forgoing exemplary embodiments of materials for making dielectric film capacitors have been described generically, without reference to particular materials for the dielectric material or the metal film. Suitable dielectric films, already in use in conventional capacitor designs, include polyester, PET, biaxially-oriented polypropylene (OPP), polycarbonate, polyethylene naphthalate, paper, etc. Desired properties are films which can be made thin and strong, and which have high dielectric strengths. Also desired is compatibility with whatever manufacturing process is chosen for forming the metal films on the surfaces of the dielectric film. The metal used may be aluminum, zinc or mixtures thereof, or any other metal having a low bulk resistivity and compatible with the manufacturing process chosen. The metal film forming the plate areas and fuse links of the capacitor material should be formed with a thickness to produce a resistivity of about $2-20\Omega/\square$ for the metal film.

In a preferred construction of capacitor materials according to any of the foregoing embodiments, the contact edge is more heavily metallized than the plate areas of the capacitor to improve the quality of the termination. For materials having the characteristics described above, a resistivity of about $2-4\Omega/\square$ is preferred at the edge.

Segmented capacitors according to various aspects of the present invention such as illustrated by the above embodiments thereof afford to designers a higher energy density and greater safety than non-segmented types and conventional segmented types. Since fuse action quickly removes an affected segment from the capacitor, substantially less stored energy is available to discharge through the fault. The fault avalanche discussed above does not occur until a higher working voltage is reached. Therefore, applications requiring maximum working voltage of about 380V may use 4.5$\mu$m film, rather than 6$\mu$m film. Similarly, 5.5$\mu$m film satisfies 450–480V applications which previously required 8$\mu$m film. The reduction in film thickness reduces capacitor volume, increasing energy density over conventional designs, without sacrificing long-term capacitance stability.

Methods to produce embodiments of the invention, including those described above, use pattern metallized printing (PMP).

PMP generates patterns of thin metal film on a plastic film substrate, such as a dielectric film. The patterns possible with PMP techniques include extremely fine features, such as grid structures. Grids and other structures including holes in and surrounded by a metal layer, which demetallization cannot currently consistently produce, become practical with PMP. PMP generates grids and other structures having holes in metal layers having thicknesses in a range of at least 10–1,000Å. PMP is suitable for producing metal layers using a variety of metals.

Pattern metallized printing processes have been developed using equipment sold in the United States by Galileo Vacuum Systems, Connecticut, and Leybold Technologies, Inc., Connecticut. These systems are custom built to operate within and in connection with various makes of vacuum metal deposition equipment. Generally speaking, these systems operate by depositing a substance, such as an oil, onto the surface of a web of material, such as the dielectric film of the present invention, which subsequently undergoes vacuum metal deposition. The substance is selected to cause the metal to fail to adhere to selected portions of the web, thus permitting metallic patterns to be deposited on the web with a resolution limited only by the substance deposition process.

Extremely fine resolution metallization patterns are possible using this technique. The actual resolution achieved depends on several factors. The ultimate limit to resolution of this system depends upon the quantity and placement of the substance on the web. These are subject to design parameters which are generally worked out by the system manufacturer and customer.

In one machine for practicing the above-described method, the substance used is a diffusion pump oil having release characteristics similar to silicone oil. Other similar materials may also be used, provided they prevent the adhesion of vaporized metal to the surface on which they have been deposited. The entire process may be enclosed within a vacuum deposition chamber.

Figure 7:
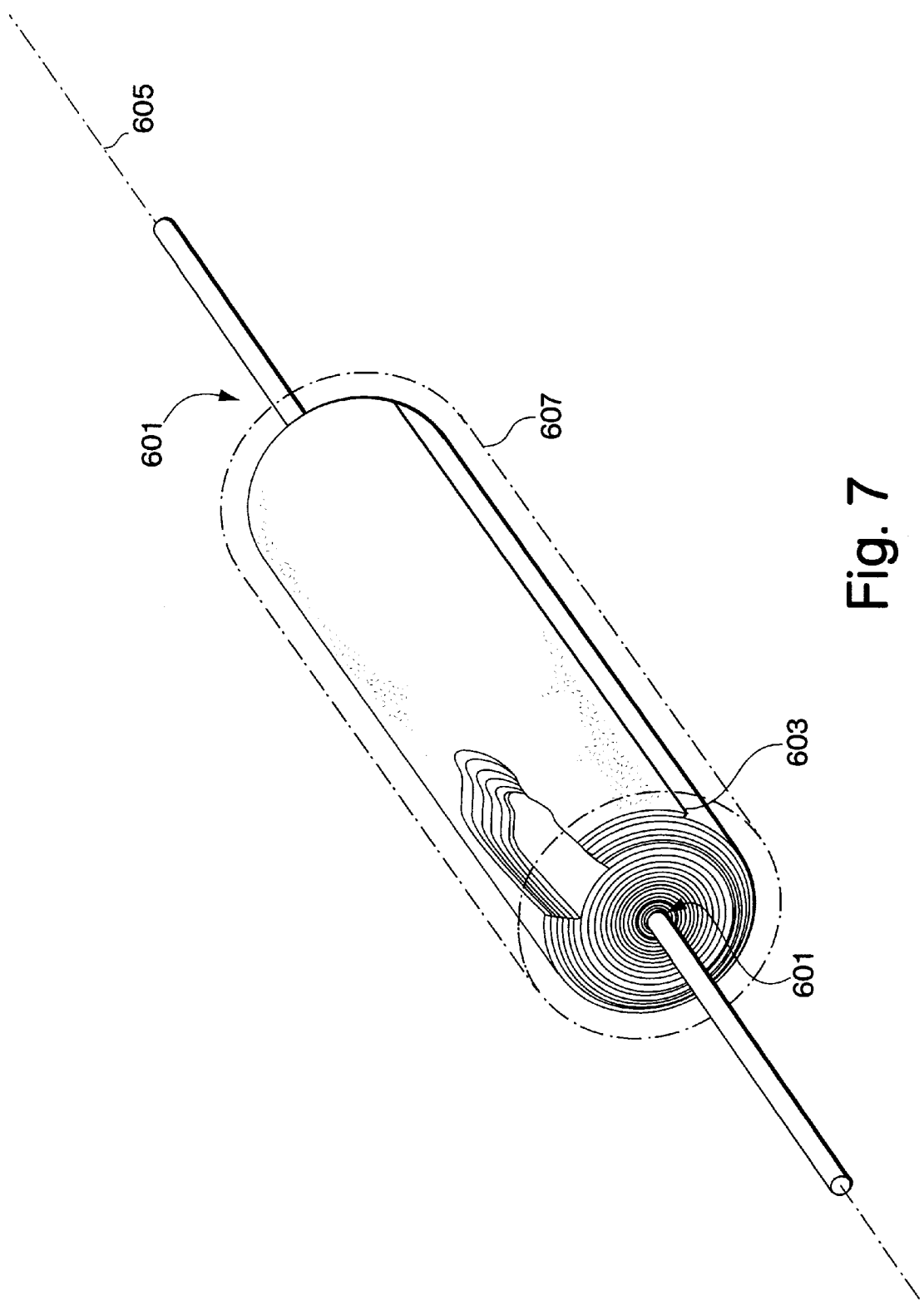
FIG. 7 is a partial cutaway view of a capacitor constructed of any of the materials of FIGS. 3–46.

A finished capacitor takes the form shown in FIG. 7.

Leads are bonded to the metal at the contact edges of the two surfaces of the dielectric film, near the center of a strip of finished material 601. The strip of material 603 is then wound in a double spiral about an axis 605 running between the two leads. The ends of the wound capacitor are spray terminated to provide good contact between the leads and their respective contact edges. A protective covering or coating 607 prevents accidental contact with an exposed metal film or other damage to the capacitor. The finished capacitor has a substantially cylindrical form, with leads extending axially from the body of the capacitor. Capacitors using the inventive materials described above are finished using conventional techniques known to those skilled in this art.

The present invention has now been described in connection with a number of specific embodiments thereof. However, numerous modifications which are contemplated as falling within the scope of the invention should now be apparent to those skilled in the art. Therefore, it is intended that the scope of the present invention be limited only by the scope of the claims appended hereto and equivalents thereof.

What is claimed is:

1. A metallized dielectric film, comprising:
a plurality of electrically interconnected metallized circular areas disposed on a surface of the dielectric film, wherein the circular areas carry an electrical charge, and a degree of electrochemical erosion experienced by metal forming the metallized dielectric film is less than a degree of electrochemical erosion which would be experienced by a similar metal film of non-circular areas.

2. The dielectric film of claim 1, further comprising fusible links electrically interconnected between pairs of circular areas.

3. The dielectric film of claim 2, each of said fusible links further comprising a metallized area of a circular shape having a smaller diameter than the plurality of metallized circular areas.

4. The dielectric film of claim 2, wherein the fusible links are formed of a grid pattern of metallized lines at a density of about 20–100 lines per inch.

5. The dielectric film of claim 1, further comprising lightly metallized areas electrically interconnecting the metallized circular areas.

6. The dielectric film of claim 1, further comprising two metallized areas electrically interconnected by two fusible links of unequal size.

7. The dielectric film of claim 6, wherein one of the two metallized areas is included in an edge contact region in which an electrical lead is attached.

8. A fuse element comprising:
a dielectric film having disposed thereon a grid pattern of metallized lines, wherein the metallized lines are formed at a density of about 20–100 lines per inch.

9. A capacitor, at least one plate of which is formed on a dielectric film and comprises:
a plurality of electrically interconnected metallized circular areas disposed on a surface of the dielectric film, further comprising fusible links electrically interconnected between pairs of circular areas.

10. The capacitor of claim 9, each fusible link further comprising a metallized area of a circular shape having a smaller diameter than the plurality of metallized circular areas.

11. The capacitor of claim 9, wherein the fusible links are formed of a grid pattern of metallized lines at a density of about 20–100 lines per inch.

12. A capacitor, at least one plate of which is formed on a dielectric film and comprises:
a plurality of electrically interconnected metallized circular areas disposed on a surface of the dielectric film, further comprising lightly metallized areas electrically interconnecting the metallized circular areas.

13. A capacitor, at least one plate of which is formed on a dielectric film and comprises:
a plurality of electrically interconnected metallized circular areas disposed on a surface of the dielectric film, further comprising two metallized areas electrically interconnected by two fusible links of unequal size.

14. The capacitor of claim 13, wherein one of the two metallized areas is included in an edge contact region in which an electrical lead is attached.

15. A capacitor formed of a metallized dielectric film comprising:
a fuse element including a grid pattern of metallized lines, wherein the metallized lines are formed at a density of about 20–100 lines per inch.

16. A metallized dielectric film, comprising:
a plurality of metallized circular areas of low resistivity; and
means interconnecting the plurality of metallized circular areas for separating one circular area from other circular areas when an excessive current flows through the means for separating.

17. The film of claim 16, wherein the means for separating operates at a smaller current than a fusing current of the plurality of metallized circular areas.

18. A metallized dielectric film, comprising:
a plurality of electrically interconnected cornerless metallized areas disposed on a surface of the dielectric film, wherein the cornerless metallized areas carry an electrical charge, and electrochemical erosion thereof is less than would be experienced by similar metallized areas having corners.

19. The film of claim 18, wherein at least one cornerless metallized area is a fusible link.

20. The film of claim 19, wherein the fusible link has a smaller area than other cornerless metallized areas.

21. The film of claim 19, wherein the fusible link comprises:
a grid of metallized lines filling the area at a density of about 20–100 lines per inch.

22. The film of claim 18, further comprising lightly metallized areas electrically interconnecting the cornerless metallized areas.

23. The film of claim 18, further comprising two metallized areas electrically interconnected by two fusible links of unequal size.

24. The film of claim 23, wherein one of the two metallized areas is included in an edge contact region in which an electrical lead is attached.

25. A metallized film, comprising:

a plurality of heavily metallized areas interconnected by a plurality of lightly metallized areas.

26. The metallized film of claim 25, wherein the plurality of lightly metallized areas and the plurality of heavily metallized areas each have a thickness of about 10–1,000 Å.

27. The metallized film of claim 25, wherein the lightly metallized areas have a resistivity of about 40–800 Ω/□ and the heavily metallized areas have a resistivity of about 2–20 Ω/□.

28. The metallized film of claim 25 wherein the lightly metallized areas vaporize at a current not more than about 20% of a current which vaporizes the heavily metallized areas.

29. The metallized film of claim 25, wherein substantially all of the film is in either a heavily metallized area or a lightly metallized area.

30. The metallized film of claim 32, formed into a capacitor and rolled into a cylindrical form, further comprising:

a terminal, electrically connected to the metallized film.

31. The film of claim 30, further comprising:

a contact edge of the metallized film having a resistivity of about 2–4 Ω/□, to which the terminal is connected.

32. A metallized film, comprising:

a light metallization covering substantially all of one surface of the film; and a plurality of non-contiguous areas of the one surface of the film, fusibly interconnected through the light metallization and having additional metallization covering the light metallization.

33. The film of claim 32, wherein each metallization has a thickness of about 10–1,000 Å.

34. The film of claim 33, wherein the light metallization has a resistivity of about 40–800 Ω/□.

35. The film of claim 34, wherein the areas having additional metallization have a resistivity of about 2–20 Ω/□.

36. The film of claim 35, wherein the light metallization vaporizes at a current not more than about 20% of a current which vaporizes the areas having additional metallization.

37. The metallized film of claim 32, formed into a capacitor and rolled into a cylindrical form, further comprising:

a terminal, electrically connected to the metallized film.

38. The film of claim 37, further comprising:

a contact edge of the metallized film having a resistivity of about 2–4 Ω/□, to which the terminal is connected.

39. The film of claim 32, wherein the light metallization is formed of one of aluminum, zinc, and a mixture of aluminum and zinc; and the additional metallization is formed of one of aluminum, zinc, and a mixture of aluminum and zinc.

* * * * *